(12) United States Patent
Chen et al.

(10) Patent No.: US 8,982,280 B2
(45) Date of Patent: Mar. 17, 2015

(54) TELEVISION AND METHOD FOR DISPLAYING PROGRAM IMAGES AND VIDEO IMAGES SIMULTANEOUSLY

(71) Applicant: Hon Hai Precision Industry Co., Ltd., New Taipei (TW)

(72) Inventors: Mei-Ju Chen, New Taipei (TW); Han-Fang Tu, New Taipei (TW); Kuan-Jung Chiu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/025,840

(22) Filed: Sep. 13, 2013

(65) Prior Publication Data

US 2014/0247393 A1    Sep. 4, 2014

(30) Foreign Application Priority Data

Mar. 4, 2013    (TW) .............................. 102107439 A

(51) Int. Cl.

| H04N 5/45 | (2011.01) |
|---|---|
| H04N 9/74 | (2006.01) |
| H04N 21/41 | (2011.01) |
| H04N 21/4223 | (2011.01) |
| H04N 21/431 | (2011.01) |

(52) U.S. Cl.
CPC ............ *H04N 5/45* (2013.01); *H04N 21/4126* (2013.01); *H04N 21/4223* (2013.01); *H04N 21/4316* (2013.01)
USPC .............................. 348/565; 348/584; 348/588

(58) Field of Classification Search
USPC .................. 348/565, 58, 584, 598, 600, 588; 345/632, 633, 639, 640; 463/40; 434/307 R, 308, 94, 98, 99
See application file for complete search history.

(56) References Cited

U.S. PATENT DOCUMENTS

| 4,971,312 | A | * | 11/1990 | Weinreich | .................... 472/63 |
| 5,712,995 | A | * | 1/1998 | Cohn | ........................ 715/792 |
| 6,198,503 | B1 | * | 3/2001 | Weinreich | .................. 348/164 |
| 6,514,083 | B1 | * | 2/2003 | Kumar et al. | ............ 434/307 A |
| 6,816,626 | B1 | * | 11/2004 | Fadel | ........................ 382/282 |
| 7,002,602 | B2 | * | 2/2006 | MacInnis et al. | ........... 345/629 |
| 2007/0122786 | A1 | * | 5/2007 | Relan et al. | .................. 434/308 |
| 2011/0225603 | A1 | * | 9/2011 | Amento et al. | ................ 725/12 |
| 2012/0229506 | A1 | * | 9/2012 | Nishikawa | .................... 345/632 |
| 2013/0332957 | A1 | * | 12/2013 | DeWeese et al. | .............. 725/37 |

* cited by examiner

*Primary Examiner* — Victor Kostak
(74) *Attorney, Agent, or Firm* — Novak Druce Connolly Bove + Quigg LLP

(57) ABSTRACT

A method for displaying video image of a television includes processing video signals corresponding to video images transmitted from an electronic device and determining whether the TV programs are displayed on a full displaying window or on a partial displaying window. The display is controlled to provide a first video image displaying window overlaying the full displaying window if the TV programs are displayed on the full displaying window or provide a second video image displaying window spaced from the partial displaying window if the TV programs are displayed on the partial displaying window. The video image is displayed in the first video image displaying window or the second video image displaying window. Any human faces in the video image displayed in the first video image displaying window cause the video image to be transparent except for the faces. A related TV is also provided.

19 Claims, 5 Drawing Sheets

TELEVISION AND METHOD FOR DISPLAYING PROGRAM IMAGES AND VIDEO IMAGES SIMULTANEOUSLY

BACKGROUND

1. Technical Field

The present disclosure relates to a television and a method for displaying video images in conjunction with a television program.

2. Description of the Related Art

Many televisions have a picture-in-picture function. That is, there is a main window for displaying content such as a TV show; and overlaid on the main window is a smaller secondary window showing different content from another TV signal or from the Internet. However, the displayed area of the second window is typically opaque and entirely obscures the overlaid portion of the main window.

BRIEF DESCRIPTION OF THE DRAWINGS

The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
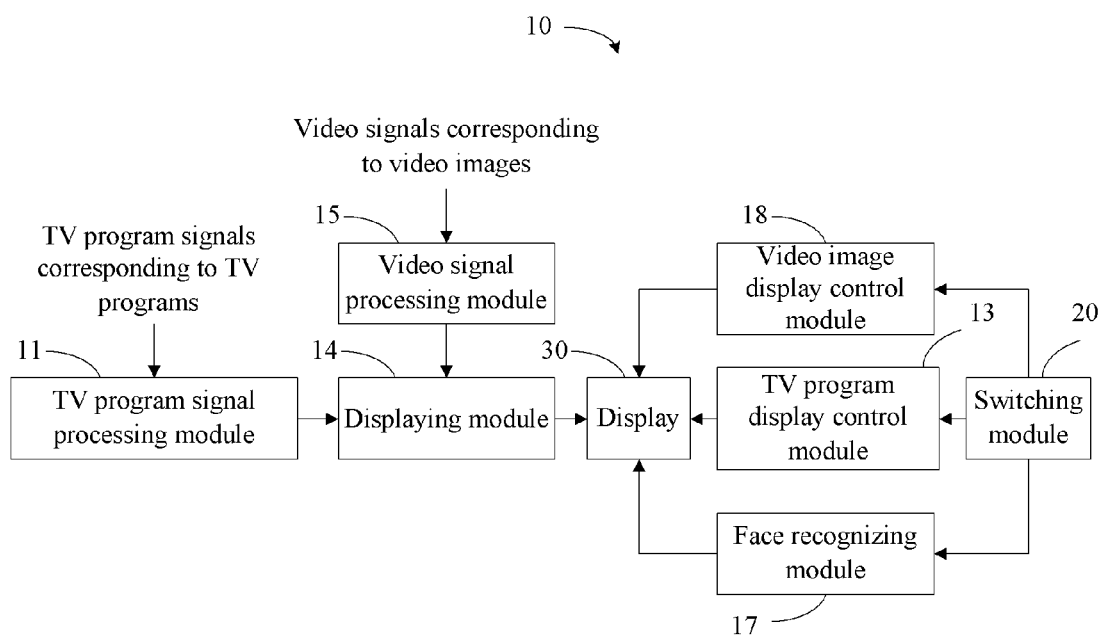
FIG. 1 is a block diagram of a television, according to an exemplary embodiment.

FIG. 1 is a block diagram block of a television (TV) 10 according to an exemplary embodiment. The TV 10 includes a switching module 20, a display 30, a TV program signal processing module 11, a TV program display control module 13, a display module 14, a video signal processing module 15, a face recognizing module 17, and a video image display control module 18.

The TV 10 has a full displaying mode and a partial displaying mode. The switching module 20 is configured to switch the TV 10 between the full displaying mode and the partial displaying mode in response to a user's operation. The switching module 20 is further configured to generate a full displaying signal in the full displaying mode and a partial displaying signal in the partial displaying mode.

Figure 2:
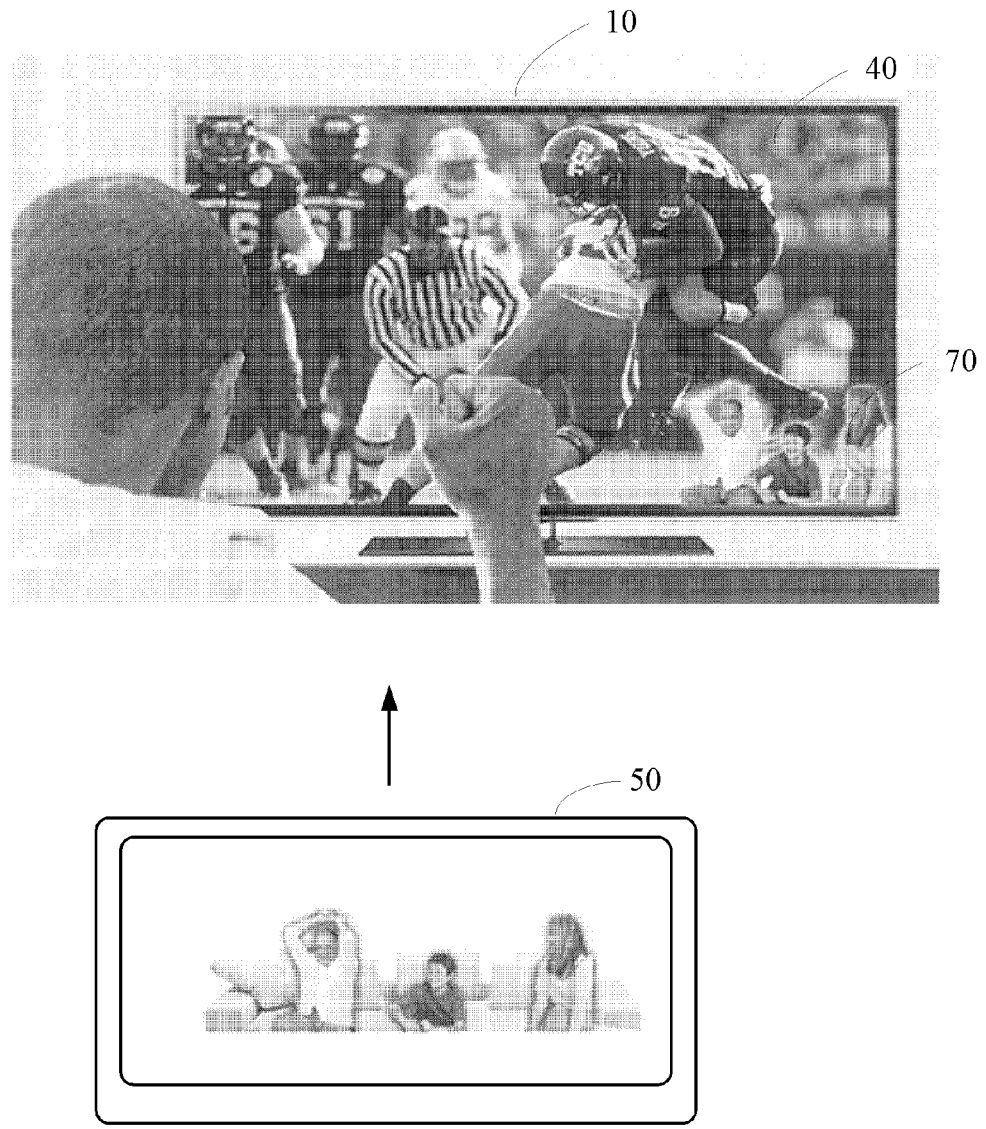
FIG. 2 is a schematic view of the television of FIG. 1 showing a television program and video images simultaneously, with portions of the video images made transparent, and the video images overlaid on the program in a full displaying mode.
Figure 3:
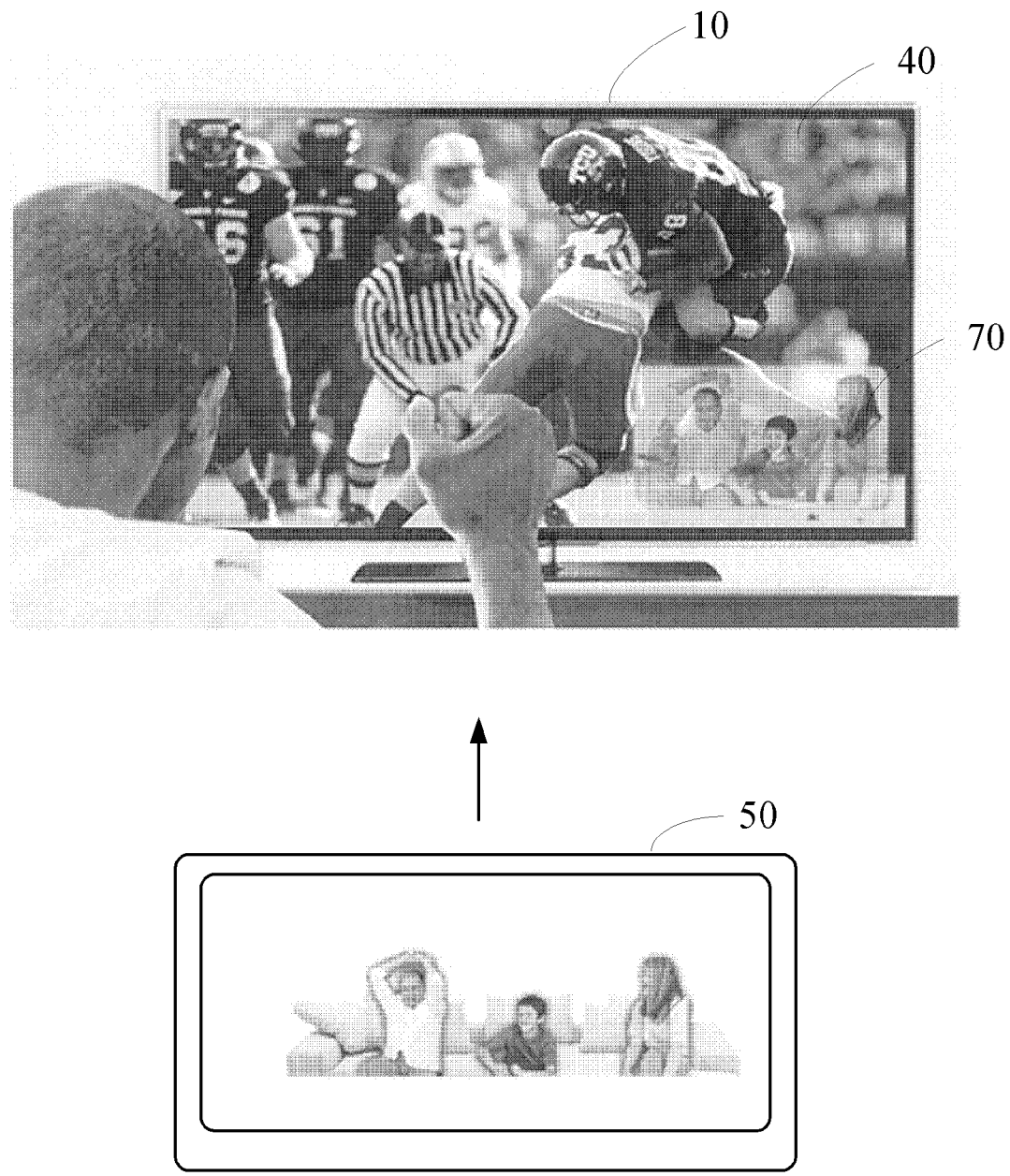
FIG. 3 is a schematic view of the television of FIG. 1 showing a television program and video images simultaneously, with portions of the video images made semitransparent, and the video images overlaid on the program in the full displaying mode.
Figure 4:
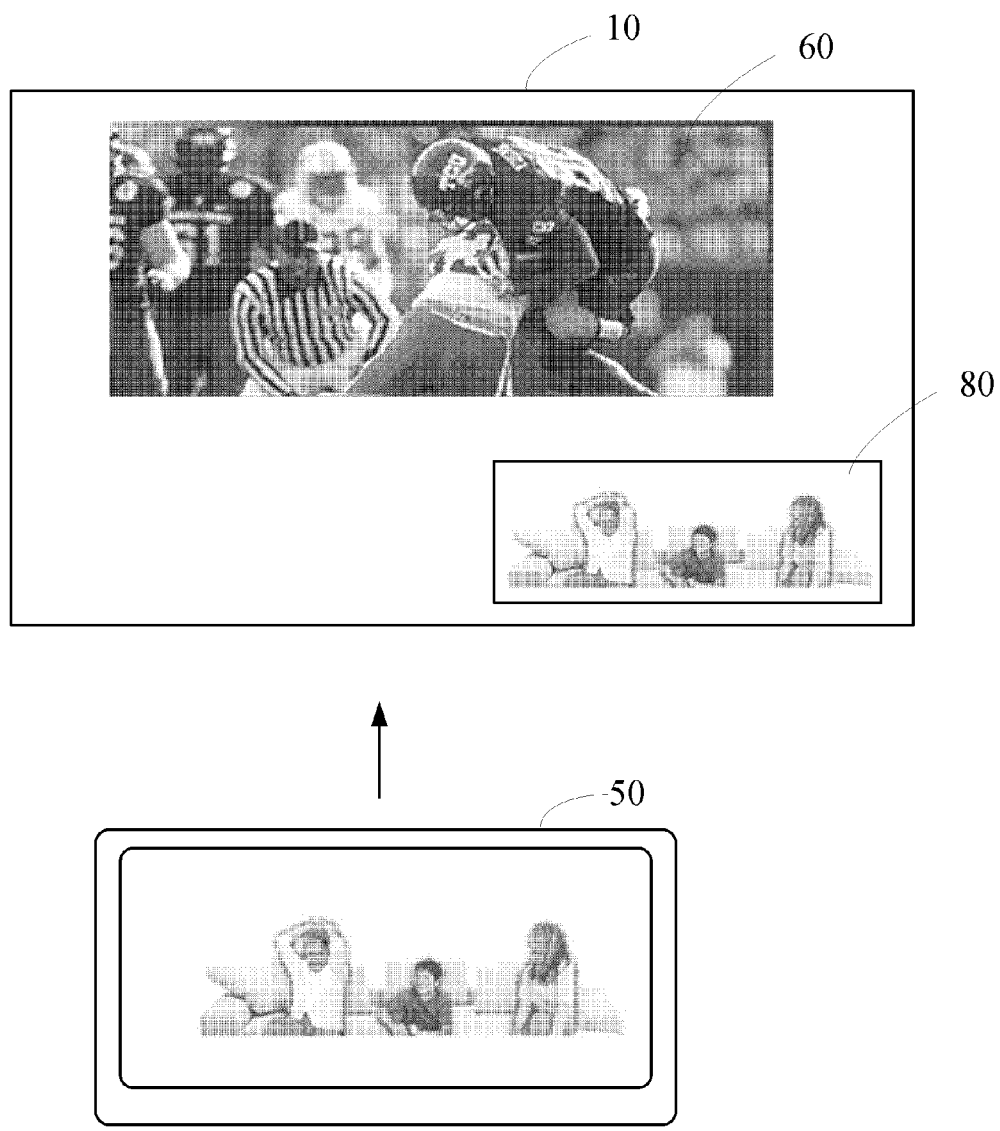
FIG. 4 is a schematic view of the television of FIG. 1 showing a television program and video images simultaneously, with both displayed in a partial displaying mode separate from each other.

Referring also to FIGS. 2-4, the TV program display control module 13 is configured to control the display 30 to provide a full displaying window 40 which covers the whole area of the display 30 in response to the full displaying signal, and control the display 14 to provide a partial displaying window 60 which partly covers the area of the display 30 in response to the partial displaying signal.

The TV program signal processing module 11 is configured to process TV program signals corresponding to a TV program received by the TV 10.

The displaying module 13 is configured to display the TV program on the full displaying window 40 or on the partial displaying window 60.

The video signal processing module 15 is configured to process video signals corresponding to video images received by the TV 10. The video signals are transmitted from an electronic device 50 having a video capturing function and communicating with the TV 10. The electronic device 50 may be a computer or a mobile phone, for example.

The video image displaying control module 18 is configured to control the display 30 to provide a first video image displaying window 70 which overlays the full displaying window 40 in response to the full displaying signal, or control the display 30 to provide a second video image displaying window 80 spaced from the partial displaying window 60 in response to the partial displaying signal. The area of the first video image displaying window 70 is less than that of the full displaying window 40. The display module 14 is further configured to display the video images in the first video image displaying window 70 or in the second video image displaying window 80.

The face recognizing module 17 is configured to recognize the presence of one or more human faces in the video images and make all parts of the video images, except for the faces, transparent in response to the full displaying signal. In the following description, the phrase "the video images except for the faces" is abbreviated and referred to as simply "the other video images."

Referring to FIG. 2, in the exemplary embodiment, the other video images are made to be completely transparent except for the faces. In the illustration provided in FIG. 2, the face recognizing module 17 also recognizes the presence of human bodies associated with the faces, and the presence of background furniture associated with the faces and the human bodies. Accordingly, the other video images made completely transparent do not include the human bodies and background furniture. Referring to FIG. 3, in an alternative exemplary embodiment, the other video images are made to be semitransparent. In the illustration provided in FIG. 3, the face recognizing module 17 also recognizes the presence of human bodies associated with the faces, and the presence of background furniture associated with the faces and the human bodies. Accordingly, the other video images made semitransparent do not include the human bodies and background furniture. Thus, the TV program underlying the other video images is either completely visible through the transparent other video images, or semi-visible under the semitransparent other video images.

In another alternative exemplary embodiment, the face recognizing module 17 is further configured to reduce distances between human faces when the face recognizing module 17 recognizes the presence of more than one face. In such case, the video images are displayed in a smaller second video image displaying window 80.

Figure 5:
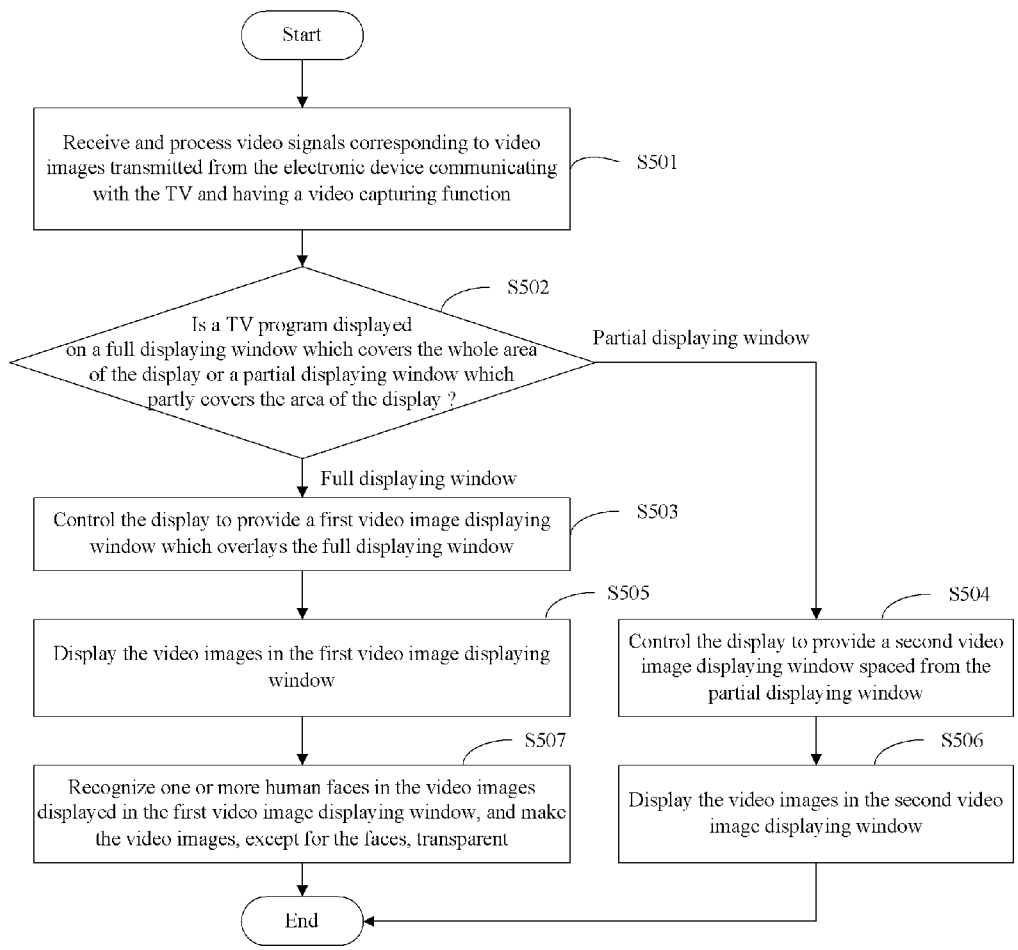
FIG. 5 is a flowchart of a method for displaying video images, according to an exemplary embodiment.

Referring to FIG. 5, this is a flowchart of a method for displaying video images, according to an exemplary embodiment. The method for displaying video images is employed in the TV 10 including the display 30.

In step S501, the video signal processing module 15 receives and processes video signals corresponding to video images transmitted from the electronic device 50 communicating with the TV 10 and having a video capturing function.

The electronic device 50 may be a computer or a mobile phone, for example. The video signal processing module 15 receives and processes the video signals in order to display the corresponding video images on the display 30.

In step S502, the video image displaying control module 18 determines whether a TV program is displayed on a full displaying window 40 which covers the whole area of the display 30 or on a partial displaying window 60 which partly covers the area of the display 30. If the TV program is displayed on a full displaying window 40, the procedure goes to step S503. If the TV program is displayed on a partial displaying window 60, the procedure goes to step S504.

In step S503, the video image displaying control module 18 controls the display 30 to provide a first video image displaying window 70 which overlays the full displaying window 40. The area of the first video image displaying window 70 is less than that of the full displaying window 40.

In step S504, the video image displaying control module 18 controls the display 30 to provide a second video image displaying window 80 spaced from the partial displaying window 60.

In step S505, the display module 14 displays the video images in the first video image displaying window 70.

In step S506, the display module 14 displays the video images in the second video image displaying window 80.

In step S507, the face recognizing module 17 recognizes the presence of one or more human faces in the video image displayed in the first video image displaying window 70, and makes the video images, except for the faces, transparent. In the exemplary embodiment, the other video images are made to be completely transparent except for the faces. In an alternative exemplary embodiment, the other video images are made to be semi-transparent. Therefore, the TV program underlying the other video images is completely visible through the transparent other video images or semi-visible under the semitransparent other video images. In another exemplary embodiment, the face recognizing module 17 is further configured to reduce the distance(s) between two or more human faces when the face recognizing module 17 recognizes the presence of more than one face. In such case, the video images are displayed in a smaller second video image displaying window 80.

It is understood that the present disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A television (TV) having a full displaying mode and a partial displaying mode, the TV comprising:
   a display;
   a TV program display control module configured to control the display to provide a full displaying window which covers the whole area of the display in response to receiving a full displaying signal;
   a TV program signal processing module configured to process TV program signals corresponding to a TV program received by the TV;
   a video signal processing module configured to receive and process video signals corresponding to video images transmitted from an electronic device communicating with the TV and having a video capturing function, the processed video signals provided for displaying on the display;
   a video image displaying control module configured to control the display to provide a first video image displaying window overlaying the full displaying window in response to the full displaying signal;
   a displaying module configured to display the TV program on the full displaying window and display the video images in the first video image displaying window when the TV is in the full displaying mode; and
   a face recognizing module configured to recognize the presence of a plurality of human faces in the video images, make all parts of the video images, except the faces, transparent in response to the full displaying signal, and reduce the distances between the faces.

2. The TV of claim 1, wherein the area of the first video image displaying window is less than that of the full displaying window.

3. The TV of claim 1, wherein the video images are made to be completely transparent except for the faces.

4. The TV of claim 1, wherein the video images are made to be semitransparent except for the faces.

5. The TV of claim 1, further comprising a switching module configured to switch the TV between the full displaying mode and the partial displaying mode in response to a user's operation, and generate the full displaying signal in the full displaying mode and a partial displaying signal in the partial displaying mode.

6. The TV of claim 5, wherein the TV program display control module is further configured to control the display to provide a partial displaying window which partly covers the area of the display in response to the partial displaying signal, the video image displaying control module is further configured to control the display to provide a second video image displaying window spaced from the partial displaying window in response to the partial displaying signal, and the displaying module is further configured to display the TV program on the partial displaying window and display the video images in the second video image displaying window when the TV is in the partial displaying mode.

7. The TV of claim 3, wherein the face recognizing module also recognizes the presence of human bodies associated with the faces, and the presence of background furniture associated with the faces and the human bodies, and accordingly the other video images made completely transparent do not include the human bodies and background furniture.

8. The TV of claim 4, wherein the face recognizing module also recognizes the presence of human bodies associated with the faces, and the presence of background furniture associated with the faces and the human bodies, and accordingly the other video images made semitransparent do not include the human bodies and background furniture.

9. A method for displaying video images on a TV, wherein the TV comprises a display, the method comprising:
   receiving and processing video signals corresponding to video images transmitted from an electronic device communicating with the TV;
   determining whether a TV program is displayed on a full displaying window which covers the whole area of the display or a partial displaying window which partly covers the area of the display;
   controlling the display to provide a first video image displaying window overlaying the full displaying window if the TV program is displayed on the full displaying window; and
   recognizing the presence of a plurality of human faces in the video images displayed in the first video image displaying window, making the video images, except for the faces, transparent, and reducing the distances between the faces.

10. The method of claim 9, wherein the area of the first video image displaying window is less than that of the full displaying window.

11. The method of claim 9, wherein the video images are made to be completely transparent except for the faces.

12. The method of claim 9, wherein the video images are made to be semitransparent except for the faces.

13. The method of claim 9, further comprising:
controlling the display to provide a second video image displaying window spaced from the partial displaying window if the TV programs are displayed on the partial displaying window; and
displaying the video images in the second video image displaying window.

14. A method for displaying video images on a TV, wherein the TV comprises a display, the method comprising:
displaying a TV program on a full displaying window which covers the whole area of the display;
receiving and processing video signals corresponding to video images transmitted from an electronic device communicating with the TV;
providing a video image displaying window overlaying the full displaying window, and displaying the video images on the video image displaying window; and
recognizing the presence of a plurality of human faces in the video images displayed in the video image displaying window, and making the video images, except for the faces, transparent.

15. The method of claim 14, wherein the area of the first video image displaying window is less than that of the full displaying window.

16. The method of claim 14, wherein the video images are made to be completely transparent except for the faces.

17. The method of claim 14, wherein the video images are made to be semitransparent except for the faces.

18. A method for displaying video images on a display, the method comprising:
displaying a TV program on a full displaying window which covers the whole area of the display;
receiving and processing video signals corresponding to video images transmitted from an electronic device;
providing a video image displaying window overlaying the full displaying window, and displaying the video images on the video image displaying window; and
recognizing the presence of a plurality of human faces in the video images displayed in the video image displaying window, making the video images, except for the faces, transparent, and reducing the distances between the faces.

19. The method of claim 18, wherein the video images are made to be completely transparent or semitransparent except for the faces.

* * * * *